United States Patent
Delevski et al.

(10) Patent No.: US 9,973,124 B2
(45) Date of Patent: May 15, 2018

(54) DUAL COIL GENERATOR

(71) Applicant: C.E. NIEHOFF & CO., Evanston, IL (US)

(72) Inventors: Dimitar Delevski, Northbrook, IL (US); Issam Jabaji, Glenview, IL (US)

(73) Assignee: C.E. Niehoff & Co., Evanston, IL (US)

( * ) Notice: Subject to any disclaimer, the term of this patent is extended or adjusted under 35 U.S.C. 154(b) by 0 days. days.

(21) Appl. No.: 14/279,814

(22) Filed: May 16, 2014

(65) Prior Publication Data

US 2015/0333680 A1 Nov. 19, 2015

(51) Int. Cl.
*H02P 9/48* (2006.01)
*H02P 9/10* (2006.01)
*H02P 9/30* (2006.01)

(52) U.S. Cl.
CPC ............... *H02P 9/10* (2013.01); *H02P 9/107* (2013.01); *H02P 9/305* (2013.01); *H02P 9/48* (2013.01)

(58) Field of Classification Search
CPC .. H02P 9/48; H02P 9/305; H02P 9/107; H02P 9/10
USPC ....................................................... 322/28, 63
See application file for complete search history.

(56) References Cited

U.S. PATENT DOCUMENTS

| | | | |
|---|---|---|---|
| 4,539,515 A * | 9/1985 | Morishita | H02J 7/1423 307/16 |
| 4,882,515 A | 11/1989 | Radomski | |
| 5,177,388 A | 1/1993 | Hotta et al. | |
| 5,254,936 A * | 10/1993 | Leaf | H02J 7/1423 307/84 |
| 7,429,802 B2 | 9/2008 | Mukai et al. | |
| 2002/0190695 A1* | 12/2002 | Wall | H02J 1/10 322/17 |
| 2004/0222639 A1* | 11/2004 | Turner | B60K 6/26 290/3 |
| 2007/0057514 A1* | 3/2007 | Mukai | H02K 16/00 290/40 C |
| 2008/0007229 A1* | 1/2008 | Jabaji | H02P 9/30 322/69 |
| 2008/0164852 A1* | 7/2008 | Taniguchi | H02P 9/006 322/25 |
| 2009/0058374 A1* | 3/2009 | Evans | H02K 11/046 322/28 |
| 2010/0079117 A1* | 4/2010 | Bekiarov | H02J 7/1438 322/28 |

(Continued)

FOREIGN PATENT DOCUMENTS

WO WO 2013097867 A2 * 7/2013 ........... F03D 7/0264

*Primary Examiner* — Viet Nguyen
(74) *Attorney, Agent, or Firm* — Banner & Witcoff, Ltd.

(57) ABSTRACT

A vehicle electrical system comprises a generator which provides electrical power to an electrical load. The generator includes two field coils. A first switch circuit is coupled with the first field coil and a second switch circuit is coupled with the second field coil. A control device, included in the electrical system, operates the first and second switch circuits to regulate the generator output voltage and, in the alternative, to further reconfigure and/or deactivate the switch circuits based on their operating states. The generator maybe further coupled with an electrical energy absorbing device and the control device maybe further configured to operate on a switch, coupled with the electrical energy absorbing device, in response to a shutdown condition, RPM, rate of change of RPM, and voltage transient.

20 Claims, 6 Drawing Sheets

(56) References Cited

U.S. PATENT DOCUMENTS

| | | | |
|---|---|---|---|
| 2013/0009397 A1* | 1/2013 | Ito | H02P 9/305 |
| | | | 290/44 |
| 2013/0234678 A1 | 9/2013 | Patterson et al. | |
| 2014/0312621 A1* | 10/2014 | Hung | F03D 7/0272 |
| | | | 290/44 |
| 2014/0312622 A1* | 10/2014 | Gupta | F03D 7/0264 |
| | | | 290/44 |
| 2014/0375056 A1* | 12/2014 | Perry | H02J 7/34 |
| | | | 290/44 |

* cited by examiner

DUAL COIL GENERATOR

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to a vehicle electrical system including a generator, comprising two field coils, which operates to provide electrical power to an electrical load. A first and second switch circuits are coupled with the two field coils and a control device is configured to utilize the switch circuits to regulate the generator output voltage and, in the alternative, to further reconfigure and/or deactivate the switch circuits based on their operating states. An electrical energy absorbing device maybe further coupled with the generator via a switch and the control device maybe further configured to operate on the switch in response to a shutdown condition, RPM, rate of change of RPM, and voltage transient.

BACKGROUND

The present invention discloses a vehicle electrical system comprising a generator delivering electrical power to an electrical load. The generator includes two field coils, each generating a magnetic flux and each interacting with one or more stator windings operative to generate the electrical power. Each field coil is coupled with a switch circuit which is operated upon by a control device. The control device monitors and controls the switch circuits to regulate the generator output voltage. Both simultaneous and sequential switching of the two field coils, via the two switch circuits, maybe implemented. The control device may be concurrently configured to ascertain the operating states of the switch circuits and controllably reconfigure and/or deactivate the switch circuits based on the operating states. The operating states may be further communicated to the vehicle electrical system. An electrical energy absorbing device may be coupled with the generator via a switch and the control device may be further configured to apply one or more control signals to the switch facilitating voltage transient suppression and generator drive system protection due to generator deceleration and/or vehicle operating condition.

The generator includes two independent field coils in order to lower the electrical field current in each of the two field coils while providing the same electrical output power that could be obtained through a single but larger field coil. Using two smaller independent field coils instead of one large field coil in the generator is advantageous because it allows the generator to operate, at least at half power, when a malfunction occurs. The malfunction could be due to the field coil or switching circuit. A single malfunctioning field circuit, comprising of the field coil and the switch circuit, renders the generator inoperable whereas a generator with two field circuits, each comprising of a field coil and a switch circuit, can operate at half power even when one of the field circuits fails.

A further advantage is realized during sudden disconnection of the electrical load. Known to artisans of ordinary skill, sudden removal of the electrical load causes the generator to exhibit large voltage transients due to slow dissipation of the large electrical energy stored in a single field coil. Utilizing two field coils reduces the electrical current in each of the two field coils, reduces the magnitude of the stored electrical energy in each of the two field coils, dissipates the stored electrical energy faster and, therefore, substantially decreases the voltage transients due to sudden removal of the electrical load.

Each switch circuit can have multiple switches for redundancy and improved protection. See, for instance, Jabaji, U.S. Pat. No. 7,276,804 and its progenies, incorporated herein by reference in their entireties. In a preferred embodiment, two switches are used in each of the two switch circuits and the control device is configured to controllably reconfigure and/or deactivate one or both switch circuits. Accordingly, the generator can continue to produce electrical power even when a switch malfunctions. In the event the switch circuits cannot be reconfigured, the control device may be configured to deactivate the switch circuit associated with the malfunctioning field circuit.

An electrical energy absorbing device such as a resistor, a metal oxide varistor, or a zener diode may be coupled with the generator to reduce voltage transients and to protect the generator drive system. The electrical energy absorbing device may be used to dump electrical power in it when the electrical load is suddenly removed. This will further reduce the associated voltage transient. The electrical energy absorbing device may be used further to provide a braking load on the generator rotor during generator deceleration or vehicle shutdown, thereby, protecting the generator drive system.

Vehicle electrical systems are normally comprised of an electrical load and a generator, including a voltage regulator, supplying electrical power to the electrical load. Such electrical load includes, but is not limited to, one or more stored energy sources, instrumentation, electronic vehicle control systems, heating elements, lights, stereo systems, wiring system, and/or any other electrical device which may either supply or consume electrical energy to or from said vehicle electrical system. The generator supplies electrical power to the vehicle electrical system when the vehicle's engine is operating. The voltage regulator's primary function is to regulate the generator's output power at a specific reference voltage. Modern voltage regulators also function to monitor and control the generator's performance to protect the vehicle electrical system. (See, Becker et al., U.S. Pat. No. 6,184,661, and Jabaji, U.S. Pat. No. 5,907,233.)

Conventional voltage regulators operate to maintain the output voltage of the generator at a constant voltage. As the number and operational complexities of electronic components in the vehicle electrical system increase, the voltage regulator must accordingly provide system monitoring and protection in addition to voltage regulation. As such, control devices are utilized that couple with generators to monitor and manage electrical power distribution throughout the electrical system in addition to maintaining the output voltage of the generator at a regulation/common/system voltage.

For instance, the commonly assigned U.S. Pat. No. 7,276,804, entitled "Voltage Regulator with Improved Protection and Warning System" and its progenies hereby incorporated by reference in their entireties, discloses a vehicle electrical system voltage regulator with improved electrical protection and warning means that discerns and responds to regulator, generator, or vehicle electrical system operation and malfunctions. The regulator includes monitoring, control, and protection circuits with a phase signal monitor, a field switching circuit that operates the field coil in response to electrical power demands, and a field enable switch in series with the field regulating switch. The phase monitor and protection circuit ascertains and transmits generator rotational motion for use by the monitoring and control circuit in discerning the various operating conditions. The monitoring and control circuit operates on the field switching circuit to meet the electrical power demands and provide multi level fault protection to include field switching circuit reconfiguration to continue operating under various fault conditions. A warning and diagnostic system incorporating visual indicators and communication lines provide descriptive system information for use by the vehicle's operator and computer network, respectively.

In the commonly assigned U.S. Pat. No. 6,184,661, entitled "Regulator with Alternator Output Current and Input Drive Power Control," hereby incorporated by reference in its entirety, an alternator regulator controls both output voltage and output current, limits input drive power and torque, and maintains output power within a prescribed range while operating over a wide ambient temperature range and shaft speed range. Voltage, shaft speed, and temperature signals are monitored, and the results are processed to determine the output current and to control the output power without exceeding the programmed limits for output voltage, output current, temperature, output power, drive power, torque, and shaft speed. This provides a predictable output power characteristic for the alternator and it eliminates high input drive power and torque excursions that occur at low temperature and certain shaft speeds. If programmed limits are exceeded over a specified interval, and the alternator does not respond to the control changes imposed by the regulator, the regulator will turn off the alternator's field current, activate an alarm circuit, and set fault codes. The regulator is also capable of communicating with other control systems to provide status, specify needs, and respond to requests.

Incorporating and applying these technologies to a high electrical output power generator with two independent field coils substantially improves its performance. Electrical systems, such as those implemented in modern vehicles, include complex electronics and electrical equipment. Such electrical systems are normally comprised of an internal combustion engine and a generator. The engine supplies the generator with mechanical power, via a drive system, and the generator converts it into electrical power for the electrical system consumption. As the number of electrical components increase, the generator's electrical output power must also increase. This is accomplished by increasing the size of the generator, specifically, by increasing the magnitude of its magnetic flux. As a result, larger field coils are utilized to produce the required magnetic flux.

In a vehicle electrical system where a generator is used to meet all the electrical power demand by various electrical components, proper protection of the generator becomes essential to maintaining the operational integrity of the vehicle electrical system. In particular, the generator's field circuit, comprising of the field coil and its switch circuit, must be well protected because they are the source of its output power. A generator with a single faulty field circuit renders the vehicle electrical system inoperative, whereas a generator with two independent field coils, one faulty and one operational, continues to function as if there is no fault assuming only one half (½) of maximum power is required. Even at maximum power condition, the generator continues to provide electrical power, albeit at a lower voltage.

The generator is controlled by a control device. See, for example, Jabaji, U.S. Pat. No. 7,276,804. For improved protection, the control device operates on two switch circuits which are coupled with the generator's two field coils. In a preferred embodiment, each switch circuit comprises two switches. Ordinarily, one switch operates to vary the field current in the field coil, while the other protects against overvoltage condition. The control device includes an analog or digital processor that operates on the switches. When two such switch circuits are utilized in the same electrical system, it is advantageous to provide the control device with the capability of reconfiguring and/or deactivating the switch circuits in the event of a temporary malfunction or a complete breakdown. Therefore, it becomes necessary to monitor, discern, communicate and respond to such events so that the vehicle electrical system may continue normal operation without the use of additional redundant components.

Ascertaining and responding to the operating conditions of the generator and switch circuits is desirable and/or required in order to ensure that the vehicle electrical system operates without interruption. Other sophisticated electrical systems have been employed to ensure that the electrical power delivery is managed as a function of the vehicle operating conditions. For instance, in the commonly assigned U.S. Pat. No. 7,202,574 entitled "System and Method for Electric Energy Switching and Control in a Vehicle," and its progenies, hereby incorporated by reference in their entireties, a control device determines the vehicle's operating conditions and facilitates the transfer of electrical energy between systems of electrical energy sources and their associated electrical loads based on the vehicle operating conditions. The device further determines the operating conditions of the systems of electrical energy sources and their associated electrical loads and facilitates the transfer of electrical energy between them in accordance with said operating conditions.

The present invention seeks to provide a generator with two independent field coils, coupled with two switch circuits, and a control device which operates on the switch circuits to regulate the generator output voltage and supply continuous electrical power even when a fault occurs. This can be accomplished by utilizing two field circuits which are operated independently by a single control device capable of monitoring their operations and reconfiguring and/or deactivating them when necessary. In addition, the invention seeks to improve on transient response and drive system protection.

Although various systems have been proposed which touch upon some aspects of the above problems, they do not provide solutions to the existing limitations in providing a generator with two independent field circuits. For example, Mukai et al., U.S. Pat. No. 7,429,802 discloses a vehicle-use generator which includes a first rotor core having a first field coil wound therearound, a second rotor core having a second field coil wound therearound, a rotating shaft belt-driven by a vehicle engine, the first and second rotor cores being mounted in tandem on the rotating shaft, a stator core having a stator coil wound therearound, and disposed radially outwardly of the first and second rotor cores so as to form a circumferential gap with the first and second rotor cores. The first and second field coils are connected substantially in parallel to each other when viewed from an external field current supply source supplying field currents to the first and second field coils. However, in Mukai's generator the field coils are mounted on the shaft and rotating with the shaft, whereas the vehicle electrical system, control device, and methods of operation are not limited to such generators. In addition, the operating conditions of the switch circuits in the present invention are monitored and responded to by the control device, whereas Mukai provides no such monitoring or control.

Hotta et al., U.S. Pat. No. 5,177,388 discloses a tandem type alternator which comprises a rotor rotatably supported inside a housing and having rotor cores having magnetic poles formed on outer peripheral portions of the rotor cores, respectively, and a plurality of stators arranged on an inside wall of the housing and in tandem in the direction of the axis of rotation of the rotor and having tooth-shaped stator cores which are positioned to be opposite to the magnetic poles of the rotor cores and on which multi-phase windings are wound, respectively. The stators have respectively the multi-phase windings wound thereon so that both multi-phase windings are shifted from each other in the direction of the axis of rotation of the rotor. The housing has ventilation window portions formed between and near the plurality of stators which provide communication between the interior and exterior of the housing, so that ventilation resistance within the housing is reduced and the cooling effect is increased. However, Hotta's alternator has rotating field coils and its control circuit does not control the switch circuits according to the operating states.

Radomski, U.S. Pat. No. 4,882,515 discloses an alternating current generator for supplying the electrical loads on a motor vehicle. The generator has a stator core that carries a three-phase stator or output winding. The rotor of the generator has two claw pole members that are so oriented that the fingers of the pole members are aligned. Disposed between the two pole members is a third pole member having projections disposed between the aligned fingers of the claw pole members. The rotor has two field coils which are so arranged and energized that the magnetic polarity of the two claw pole members is the same and opposite the magnetic polarity of the third pole member. One of the field coils can be replaced by a permanent magnet and when this is done the generator is provided with a magnetic circuit that can divert permanent magnet flux away from the stator core. Flux diversion is controlled by supplying unidirectional current to the field winding under the control of a voltage regulator. Radomski's generator also suffers from the same limitation of being limited to rotating field coils and control circuit lacking control over the switch circuits according to their operating conditions.

Generators, delivering large electrical power, can benefit from utilizing two independent field circuits. A vehicle electrical system which includes such generator would also benefit from using a single control device which can further respond to the field circuits' operating conditions. Transient effects due to sudden disconnection of such large electrical loads can be very detrimental to other electrical components in the vehicle electrical system and suppression of such transients is necessary. Protection of the generator drive system also becomes essential when large mechanical power is applied to the generator.

The present invention offers a simple, yet efficient, alternative to existing technologies by incorporating a single controller which controls two independent field coils. In particular, the control device controls two field circuits of a high electrical output generator while responding to their operating states. In addition, the control device operates on an electrical energy absorbing device, via a switch, to further suppress transient effects and protect the drive system.

SUMMARY

The present invention discloses a vehicle electrical system, including method of operation, comprising a generator which includes a first field coil and a second field coil. The generator provides electrical power to an electrical load. A first switch circuit and a second switch circuit are coupled with the first and second field coils, respectively. A control device operates the switch circuits to regulate the output voltage of the generator utilizing the first and second field coils. In a preferred embodiment, the control device is further configured to reconfigure and/or deactivate the switch circuits in response to their operating states. An electrical absorbing device maybe further coupled with the generator via a switch and the control device maybe further configured to operate the switch in response to a shutdown condition, RPM, change of RPM, and voltage transient.

In one aspect, a vehicle electrical system comprises a generator coupled with an electrical load, said generator comprising a first field coil and a second field coil, a first switch circuit coupled with the first field coil, a second switch circuit coupled with the second field coil, and a control device coupled with the generator, first switch circuit, and second switch circuit, wherein the control device is configured to ascertain an output voltage of the generator, ascertain operating states of at least one of the first and second switch circuits, apply one or more control signals to at least one of the first and second switch circuits to regulate the output voltage at a regulation voltage in response to the output voltage, and one of reconfigure and deactivate at least one of the first and second switch circuits in response to the operating states.

Preferably, each of said operating states comprises a properly operating state and an improperly operating state. Preferably, each of the first and second switch circuit comprises two switches, and wherein the properly operating state of the first or second switch circuit corresponds to the two switches in the first or second switch circuit switching in response to the control device and improperly operating state of the first or second switch circuit corresponds to at least one of the two switches in the first or second switch circuit failing to switch in response to the control device.

Preferably, the control device is further configured to communicate said operating states to the vehicle electrical system.

Preferably, the system further comprises an electrical energy absorbing device coupled with the generator, via a switch, wherein the control device is further coupled with the switch and configured to apply a load-dump signal to the switch when the output voltage is above a threshold value.

Preferably, the system further comprises an electrical energy absorbing device coupled with the generator, via a switch, wherein the control device is further coupled with the switch and configured to ascertain a rotational speed of the generator, and apply a brake signal to the switch in response to at least one of the rotational speed and a rate of change of the rotational speed.

Preferably, the system further comprises an electrical energy absorbing device coupled with the generator, via a switch, wherein the control device is further configured to ascertain a shutdown condition of the vehicle, and apply a brake signal to the switch in response to the shutdown condition.

In another aspect, a vehicle electrical system comprises a generator coupled with an electrical load, said generator comprising a first field coil and a second field coil, a first switch circuit coupled with the first field coil, a second switch circuit coupled with the second field coil, and a control device coupled with the generator, first switch circuit, and second switch circuit, wherein the control device is configured to ascertain an output voltage of the generator and apply one or more control signals to at least one of the first and second switch circuits to regulate the output voltage at a regulation voltage in response to the output voltage.

In another aspect, a method for controlling a vehicle electrical system is disclosed wherein the system comprises a first switch circuit, a second switch circuit, a generator which includes a first field coil and a second field coil, wherein said generator is coupled with an electrical load and said first switch circuit is coupled with the first field coil and said second switch circuit is coupled with the second field coil, wherein the method comprises ascertaining an output voltage of the generator, ascertaining operating states of at least one of the first and second switch circuits, applying one or more control signals to at least one of the first and second switch circuits to regulate the output voltage at a regulation voltage in response to the output voltage, and one of reconfiguring and deactivating at least one of the first and second switch circuits in response to the operating states.

Preferably, the system further comprises an electrical energy absorbing device coupled with the generator, via a switch, wherein the method further comprises applying a load-dump signal to the switch when the output voltage is above a threshold value.

Preferably, the system further comprises an electrical energy absorbing device coupled with the generator, via a switch, wherein the method further comprises ascertaining a rotational speed of the generator and applying a brake signal to the switch in response to at least one of the rotational speed and a rate of change of the rotational speed.

Preferably, the system further comprises an electrical energy absorbing device coupled with the generator, via a switch, wherein the method further comprises ascertaining a shutdown condition of the vehicle and applying a brake signal to the switch in response to the shutdown condition.

In another aspect, a control device is disclosed wherein the control device is coupled with a first switch circuit, a second switch circuit, and a generator which includes a first field coil and a second field coil, wherein said generator is coupled with an electrical load and said first switch circuit is coupled with the first field coil and said second switch circuit is coupled with the second field coil, wherein the control device comprises a controller, and wherein the controller is configured to measure an output voltage of the generator, via an output-voltage sense line, measure operating states of at least one of the first and second switch circuits, via one or more operating-state sense line, apply one or more control signals to at least one of the first and second switch circuits to regulate the output voltage at a regulation voltage in response to the output voltage, via one or more control lines, and one of reconfigure and deactivate at least one of the first and second switch circuits in response to the operating states, via the one or more control lines.

Preferably, the generator is further coupled with an electrical energy absorbing device, via a switch, wherein the control device is further coupled with the switch, and wherein the controller is further configured to apply a load-dump signal to the switch when the output voltage is above a threshold value, via the one or more control lines.

Preferably, the generator is further coupled with an electrical energy absorbing device, via a switch, wherein the control device is further coupled with the switch, and wherein the controller is further configured to measure a rotational speed of the generator, via a speed sense line, and apply a brake signal to the switch in response to at least one of the rotational speed and a rate of change of the rotational speed, via the one or more control lines.

Preferably, the control device is further coupled with a vehicle, wherein the generator is further coupled with an electrical energy absorbing device, via a switch, wherein the control device is further coupled with the switch, and wherein the controller is further configured to measure a shutdown condition of the vehicle, via a vehicle-condition sense line, and apply a brake signal to the switch in response to the shutdown condition, via the one or more control lines.

In another aspect, a method for controlling a generator is disclosed wherein the generator includes a first field coil and a second field coil, wherein the generator is coupled with an electrical load, wherein the first field coil is coupled with a first switch circuit, and wherein the second field coil is coupled with a second switch circuit, wherein the method comprises measuring an output voltage of the generator, via an output-voltage sense line, and applying one or more control signals to at least one of the first and second switch circuits to regulate the output voltage at a regulation voltage in response to the output voltage, via one or more control lines.

Preferably, the method further comprises measuring operating states of at least one of the first and second switch circuits, via one or more operating-state sense line, and one of reconfiguring and deactivating at least one of the first and second switch circuits in response to the operating states, via the one or more control lines.

Preferably, the generator is further coupled with an electrical energy absorbing device, via a switch, wherein the method further comprises applying a load-dump signal to the switch when the output voltage is above a threshold value, via the one or more control lines.

Preferably, the generator is further coupled with an electrical energy absorbing device, via a switch, wherein the method further comprises measuring a rotational speed of the generator, via a speed sense line, and applying a brake signal to the switch in response to at least one of the rotational speed and a rate of change of the rotational speed, via the one or more control lines.

Preferably, the generator is further coupled with an electrical energy absorbing device, via a switch, wherein the method further comprises measuring a shutdown condition of a vehicle, via a vehicle-condition sense line, and applying a brake signal to the switch in response to the shutdown condition, via the one or more control lines.

DETAILED DESCRIPTION OF THE PRESENTLY PREFERRED EMBODIMENTS

Figure 1:
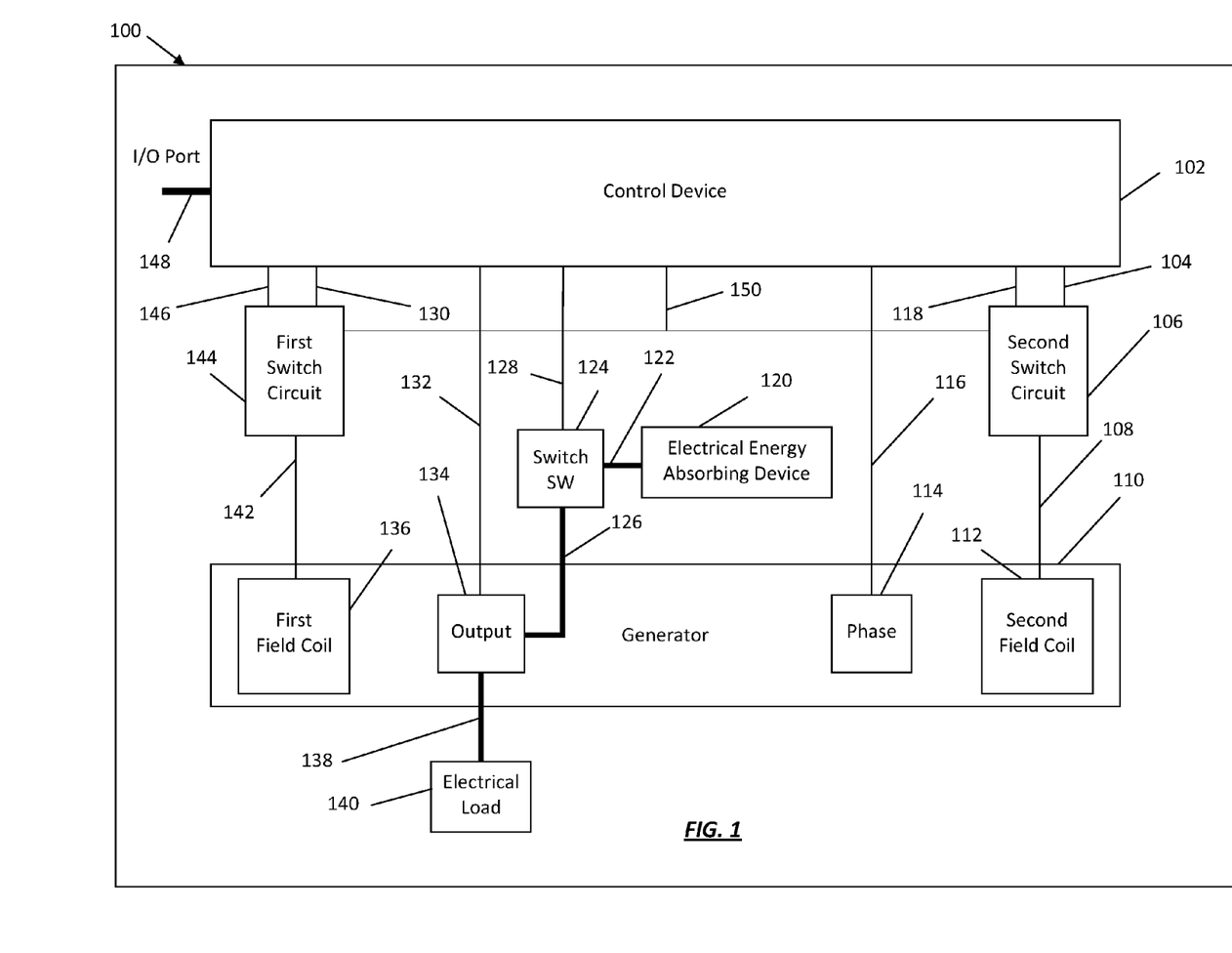
FIG. 1 shows a block diagram of a vehicle electrical system comprising a generator which includes two field coils, operated on by two switch circuits and controlled by a control device which further controls a switch coupled with an electrical energy absorbing device according to a preferred embodiment.

FIG. 1 depicts a block diagram of a preferred embodiment of a vehicle electrical system 100 comprising a generator 110 coupled with an electrical load 140 and a control device 102. In an alternative embodiment, the vehicle electrical system 100 further comprises an electrical energy source, such as a battery (not shown), coupled with the generator 110. The generator 110 includes a first field coil 136 and a second field coil 112. The generator 110 maybe a multiphase generator, known to artisans of ordinary skill, one of which is shown as element 114. The generator 110 further includes an output terminal 134 which is coupled with the electrical load 140 and an electrical energy absorbing device 120 via a switch 124. The electrical load 140 may be one or more of a starter motor, a heating element, an air conditioning unit, a compressor, a cooling fan, headlights, or a pump, to name a few examples.

The control device 102 is coupled with a first switch circuit 144 and second switch circuit 106. The first switch circuit 144 is coupled with the first field coil 136 and the second switch circuit 106 is coupled with the second field coil 112. The control device 102 is further coupled with the phase 114, the output terminal 134, and the switch 124. The control device 102 is configured to ascertain an output voltage $V_O$ of the generator 110, to ascertain operating states of at least one of the first switch circuit 144 and second switch circuit 106, to regulate the output voltage $V_O$ of the generator 110 at a regulation voltage $V_R$, and to reconfigure and/or deactivate at least one of the first and second switch circuits 144 and 106 in response to the operating states. The control device 102 may be configured to measure the rotational speed (RPM) of the generator 110 by measuring the phase signal from the phase 114. In one configuration, the control device 102 computes the rate of change in the RPM, $\alpha_G$, by determining the difference between two consecutive RPM measurements within a predetermined time interval, for instance 1 second. The control device 102 further comprises an I/O port 148 whereby system parameters including but not limited to the output voltage $V_O$, regulation voltage $V_R$, overvoltage $V_{OV}$, load-dump voltage $V_{LD}$, phase winding temperature (T), control signal duty cycle (D), switching interval ($\Delta\tau$), switch circuit operating states, RPM, vehicle shutdown condition, and $\alpha_G$ can be communicated with the vehicle electrical system 100 utilizing various communication protocols such as the J1939.

In this preferred embodiment, the generator 110 is a brushless alternator having the first and second field coils 136 and 112, each generating a magnetic flux when field current passes through them. The magnetic flux interacts with one or more stator windings, such as the phase winding 114, inducing voltage across the stators which, in turn, produce the generator output current for consumption by the electrical load 140. The output terminal 134 of the generator 110 is connected to the electrical load 140 via a line 138. The generator 110 delivers electrical power to the electrical load 140 via the line 138. The generator 110 is connected to the switch 124 via a line 126, and the switch 124 is connected to the electrical absorbing device 120 via a line 122. The first field coil 136 of generator 110 is connected to the first switch circuit 144 via a line 142 and the second field coil 112 is connected to the second switch circuit 106 via a line 108. A more detailed description of the electrical connections between the first and second field coils, 136 and 112, and the first and second switch circuits 144 and 106 is discussed below in connection with FIG. 2 and FIG. 3.

The control device 102 includes a controller which may be analog or digital such as a microprocessor. In one preferred embodiment, the microprocessor is a 68HC08 processor having internal flash memory available from Freescale of Austin, Tex. It is contemplated that the processor may be a combination of individual discrete or separate integrated circuits packaged in a single housing or it may be fabricated in a single integrated circuit. The control device 102 may be configured to measure and regulate the output voltage of the generator 110 utilizing the two field coils 136 and 112 via the two switch circuits 144 and 106. In an alternative configuration, the control device may be configured to further measure operating states of the two switch circuits 144 and 106 and, selectively, reconfigure or deactivate them in response to the operating states.

The first switch circuit 144 and second switch circuit 106, each may comprise one or more switches. According to one preferred embodiment the first switch circuit 144 and the second switch circuit 106, each comprise two switches, each switch is a semiconductor integrated circuit switch module, known to artisans of ordinary skill, and each operable to switch on/off in response to the control device 102. Accordingly, each of the first switch circuit 144 and second switch circuit 106 comprises an overvoltage switch and a regulating switch, described in more detail below. Regulating switches are interchangeable with overvoltage switches in so far as their operation is concerned. However, the regulating switches function differently than the overvoltage switches. Specifically, the control device 102 utilizes the regulating switches to maintain the output voltage $V_O$ of the generator 110 at the regulation voltage $V_R$, say 14V, whereas the overvoltage switches are switched when an overvoltage $V_{OV}$ for a predetermined time interval is detected by the control device 102.

The control device 102 applies one or more control signals which comprise a step signal or a modulated signal depending on the switching scheme. The step signal may be a switch on or a switch off signal. The modulated signal may be a pulse-width-modulation (PWM) signal with duty cycle D, known to artisans of ordinary skill.

In this preferred embodiment, the control device 102 operates to regulate the output voltage $V_O$ of the generator 110 at the regulation voltage $V_R$, and to selectively reconfigure or deactivate one or both switch circuits 106 and 144. For an exemplary vehicle electrical system, the output voltage $V_O$ of the generator 110 may be maintained at the regulation voltage $V_R$, via the control device 102, at 14V for instance.

In particular, the control device 102 ascertains the output voltage $V_O$ of the generator 110 via a line 132 and applies a control signal, for instance a PWM signal, to the first switch circuit 144 and second switch circuit 106 via a line 150 to simultaneously switch on/off the first field coil 136, via a line 142, and second field coil 112, via a line 108, so that the output voltage of the generator $V_O$ is maintained at the regulation voltage $V_R$. In another embodiment where sequential switching of the first field coil 136 and second field coil 112 is feasible, the control device 102 applies a first control signal to the first switch circuit 144 via the line 150 and a second control signal to the second switch circuit 106 via another control line (not shown) to sequentially switch on/off the first field coil 136 and second field coil 112 so that the output voltage $V_O$ of the generator is maintained at the regulation voltage $V_R$. Sequential operation includes switching the first field coil 136 when the electrical load 140 is low and switching the second field coil 112, as well as the first field coil 136, when the electrical load 140 is increased. The control device 102 may periodically alternate the first and second field coils 136 and 112 to balance service time with extensive low load operation.

The control device 102 ascertains operating states of the first switch circuit 144 via a line 146 and of the second switch circuit 106 via a line 118. In this preferred embodiment, the first switch circuit 144 and second switch circuit 106 each include two switches, see FIG. 2 or FIG. 3. The first switch circuit 144 has a first regulating switch and a first overvoltage switch. The second switch circuit 106 has a second regulating switch and a second overvoltage switch. Operating states of the first switch circuit 144 and second switch circuit 106 include properly and improperly operating states.

According to a preferred embodiment, a properly operating state of the first switch circuit 144 corresponds to the first switch circuit 144 switching in response to a control signal from the control device 102 and an improperly operating state of the first switch circuit 144 corresponds to the first switch circuit 144 failing to switch in response to the control signal from the control device 102, and a properly operating state of the second switch circuit 106 corresponds to the second switch circuit 106 switching in response to a control signal from the control device 102 and an improperly operating state of the second switch circuit 106 corresponds to the second switch circuit 106 failing to switch in response to the control signal from the control device 102. See, for instance, U.S. Pat. No. 7,276,804 where, according to one embodiment, the control device 102 ascertains the operating states of a switch circuit by monitoring the switching frequency of the regulating switch.

The control device 102 applies a control signal, via a line 130, to the first switch circuit 144 to selectively reconfigure or deactivate the first switch circuit 144 when the first switch circuit 144 is operating improperly. The control device 102 applies a control signal, via a line 104, to the second switch circuit 106 to selectively reconfigure or deactivate the second switch circuit 106 when the second switch circuit 106 is operating improperly. See, for instance, U.S. Pat. No. 7,276,804 where, according to one embodiment, the control device 102 reconfigures a switch circuit by switching on/off the overvoltage switch, in place of a malfunctioning regulating switch, in order to regulate the output voltage of the generator, and deactivates a switch circuit by switching off the overvoltage switch, in light of a malfunctioning regulating switch, in order to turn off the corresponding field circuit. In case of an improperly operating state where, the control device 102 can only activate/deactivate a malfunctioning field circuit, the control device 102 may be configured to turn off (deactivate) the malfunctioning field circuit when the electrical load 140 is low and turn on (activate) the malfunctioning field circuit when the electrical load 140 is increased so that in this fault mode the generator 110 has no perceptible fault.

The electrical energy absorbing device 120 maybe a resistor, a metal oxide varistor, or a zener diode. The electrical energy absorbing device 120 is coupled with the generator 110, via the switch 124, to receive electrical power from the generator 110 in order to reduce voltage transients and to protect the generator drive system (not shown). In a preferred embodiment, the electrical energy absorbing device 120 is a 1 kW resistor. The switch 124 may be a mechanical relay, semiconductor switch, or bi-directional switch module such as the one disclosed in the commonly owned U.S. Pat. No. 7,432,613 entitled "SELF-PROTECTIVE HIGH-CURRENT LOW-LOSS BI-DIRECTIONAL SEMICONDUCTOR SWITCH MODULE AND METHOD OF OPERATION" incorporated herein by reference in its entirety.

To reduce voltage transients, the electrical energy absorbing device 120 is used to receive excess electrical power when the electrical load 140 is suddenly removed. The control device 102 applies a load-dump signal to the switch 124 to dump the excess electrical power in the generator 110 in the electrical energy absorbing device 120. In a preferred embodiment, the load-dump signal is a switch on signal followed by a PWM signal to slowly transition from full-load to no-load on the electrical energy absorbing device 120.

The electrical energy absorbing device 120 is also used during the application of a braking signal to the switch 124 to provide a braking load on the generator rotor (not shown) according to generator deceleration, RPM, or vehicle shutdown condition. In an embodiment where the generator 110 is driven by the vehicle engine (not shown), a negative change in the RPM (deceleration) of the generator 110, or alternatively a rotational speed at or below a specific RPM, prompts the control device 102 to apply the brake signal to the switch 124. In another embodiment, the control device 102 ascertains a shutdown condition of the vehicle from the vehicle electrical system 100, for instance via the I/O port 148, and applies the brake signal to the switch 124. A brake signal, similar to the above mentioned load-dump signal may be utilized.

Figure 2:
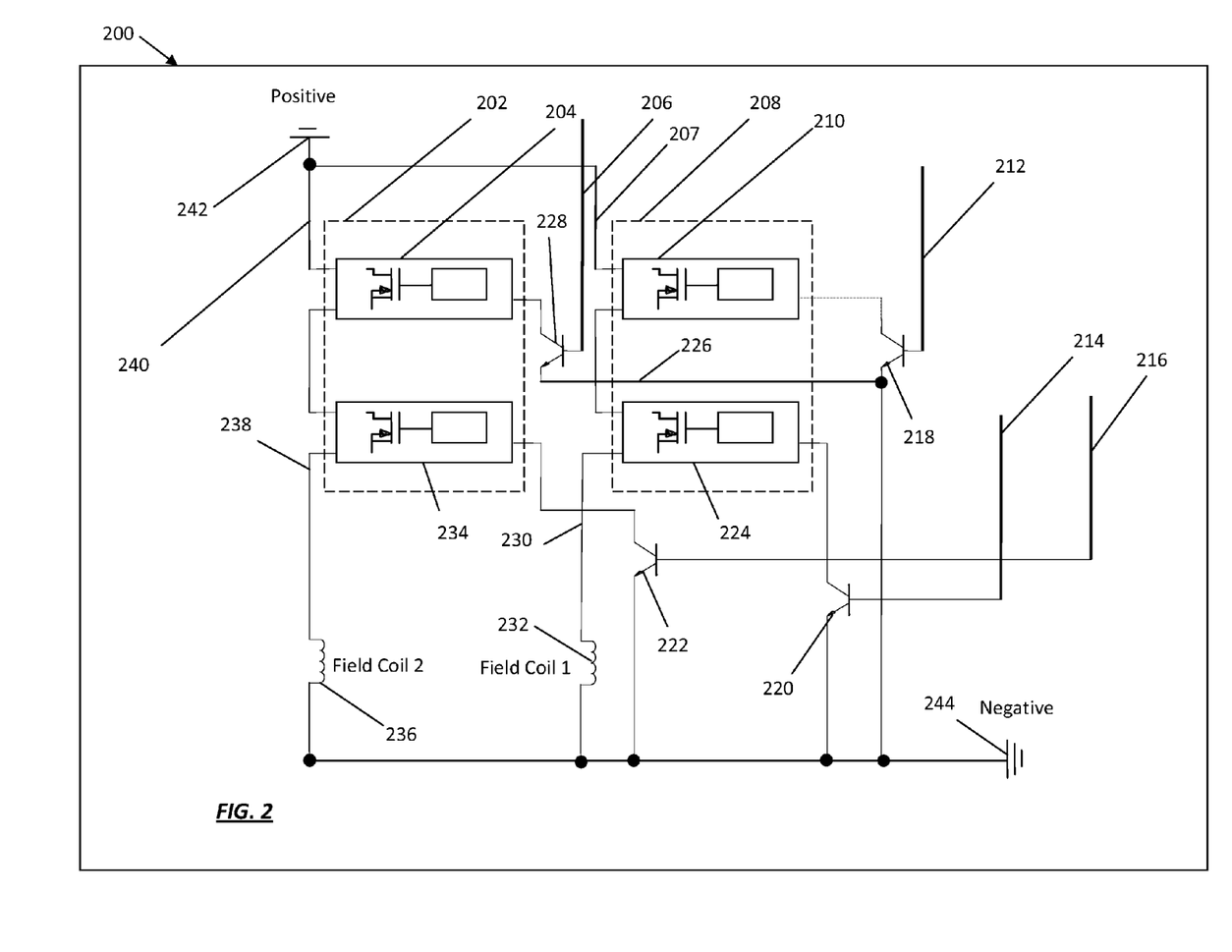
FIG. 2 shows a schematic diagram of a first switch circuit and a second switch circuit coupled with a first field coil and a second field coil according to a preferred embodiment.

FIG. 2 depicts a schematic diagram 200 of a preferred embodiment of a first and second field circuits comprising a first switch circuit 208 and second switch circuit 202 each switch circuit having two switches, a first overvoltage switch 210, a first regulating switch 224, a second overvoltage switch 204, and a second regulating switch 234, and their connections to the first field coil 232 and second field coil 236 of a generator, all four switches independently controlled by four transistors 218, 220, 228, and 222, via a control device (not shown), such as the control device 102 in FIG. 1, via control lines 212, 214, 206, and 216. This configuration allows for simultaneous as well as sequential switching of the first and second field coils 232 and 236. Accordingly, the control device may regulate the output voltage of the generator by switching on/off the first and second field coils 232 and 236 simultaneously via a first control signal, or alternatively, regulate the output voltage of the generator by switching on/off the first and second field coils 232 and 236 sequentially via a first and second control signals.

The first switch circuit 208 includes the first overvoltage switch 210 to protect against overvoltage condition, and includes the first regulating switch 224 to vary the field current of the first field coil 232 of the generator. Transistor 220 is coupled with the first regulating switch 224 and transistor 218 is coupled with the first overvoltage switch 210. Similarly, the second switch circuit 202 includes the second overvoltage switch 204 to protect against overvoltage condition, and includes the second regulating switch 234 to vary the field current of the second field coil 236 of the generator. Transistor 222 is coupled with the second regulating switch 234 and transistor 228 is coupled with the second overvoltage switch 204. The control device utilizes the four control lines 212, 214, 206, and 216 to apply control signals to the transistors 218, 220, 228, and 222 which in turn switch the switches 210, 224, 204, and 234.

Figure 3:
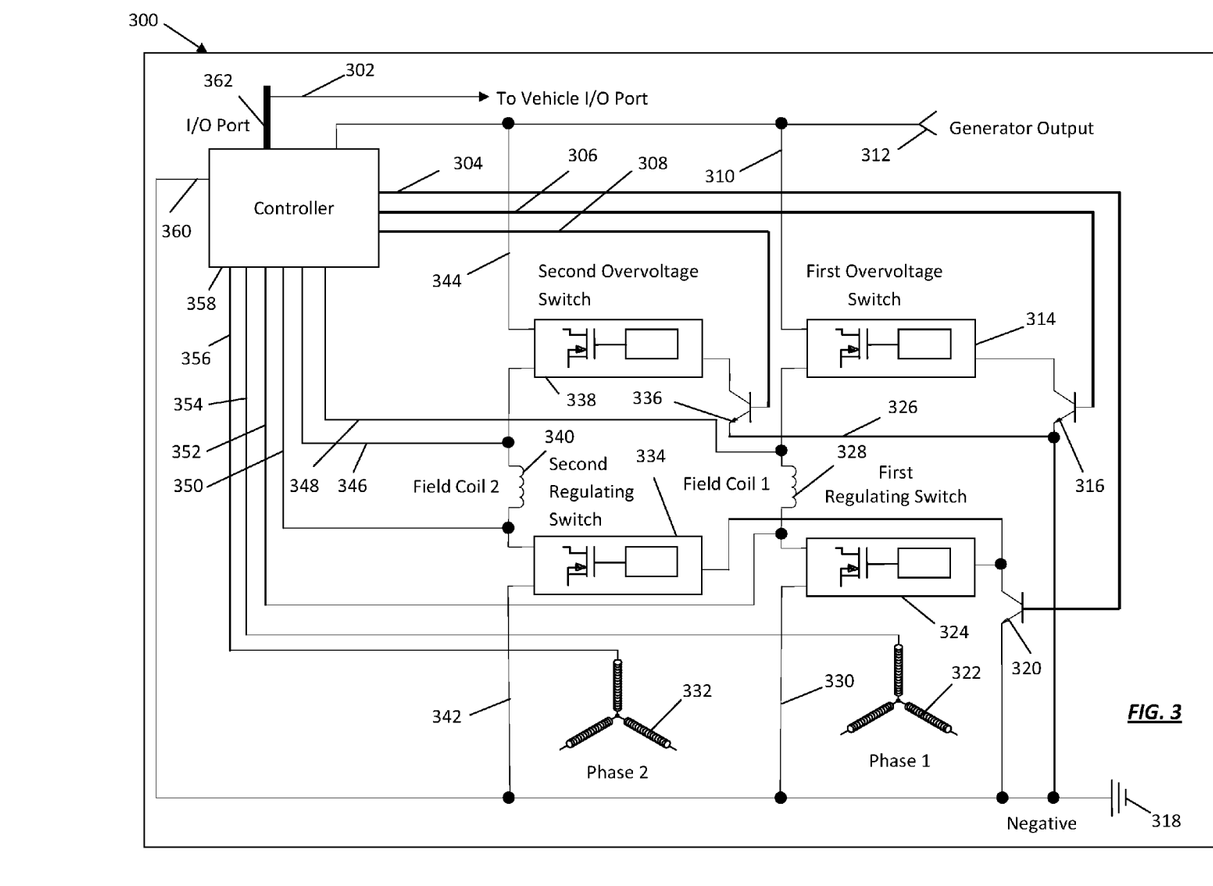
FIG. 3 shows a schematic diagram of a controller and its connections to first and second switch circuits, generator's output and phases, and vehicle I/O port according to a preferred embodiment.

FIG. 3 depicts a schematic diagram 300 of a controller 358, included in a control device such as the control device 102 in FIG. 1, and its connections to first and second regulating switches 324 and 334, first and second overvoltage switches 314 and 338, generator's first and second field coils 328 and 340, output terminal 312, and phases 322 and 332, and a vehicle I/O port 302 according to a preferred embodiment. According to this embodiment, the controller 358 switches the overvoltage switches 314 and 338 independently, via transistors 316 and 336, while switching the regulating switches 324 and 334, jointly via transistor 320. This configuration allows for simultaneous switching of the first and second field coils 328 and 340. Accordingly, the controller 358 may regulate the output voltage of the generator by switching on/off the first and second field coils 328 and 340 simultaneously via a control signal.

The controller 358 measures the output voltage 312 of the a generator, such as the generator 110 in FIG. 1, and switches on/off the first and second regulating switches 324 and 334 by applying a control signal, via a line 304, to the transistor 320 so that the output voltage $V_O$ is substantially equal to a common regulation voltage $V_R$, for instance 28V. The controller 358 utilizes the first and second overvoltage switches 314 and 338 to protect against overvoltage by applying a control signal to the transistors 316 and 336 via lines 306 and 308.

The controller 358 is further connected to the switches 314, 324, 338, and 334, via lines 348, 352, 346, and 350, so as to directly measure the switching frequencies of these switches, or alternatively, voltage levels at those points. The controller 358 measures the switching frequency of the first overvoltage switch 314 via the line 348, the first regulating switch 324 via the line 352, the second overvoltage switch 338 via the line 346, and the second regulating switch 334 via line 350. As described above, four different pre-determined time intervals maybe assigned for the switches and a switch that fails to switch on/off within the associated pre-determined time interval indicates a malfunction of that switch. See U.S. Pat. No. 7,276,804. The controller 358 is further connected to two phase windings 322 and 332 of the generator via lines 354 and 356. The AC signals on these lines can be used to measure the generator RPM, which may be used to compute the generator deceleration.

Utilizing the vehicle electrical system 100 described above and the field circuits shown in FIG. 2 and FIG. 3, two embodiments of the operation of the control device 102 are now described. The generator 110 is driven by a vehicle engine through a system of pulleys and belts (not shown but known to artisans of ordinary skill). The generator 110 delivers electrical power to the electrical load 140 via its output terminal 134. The control device 102 regulates the output voltage $V_O$ of the generator 110 at the regulation voltage $V_R$, for instance 28V. The control device 102 achieves this by controlling the field currents through the first and second field coils 136 and 112. In particular, the control device measures the output voltage $V_O$ and applies PWM signals to the first and second switch circuits 144 and 106 so that the output voltage $V_O$ is maintained at the regulation voltage $V_R$. According to the first embodiment, the field circuit shown in FIG. 3 is utilized and the control device 102 controls the field currents through the first and second field coils 136 and 112 simultaneously by applying a single control signal to both switch circuits 144 and 106. According to the second embodiment, the field circuit shown in FIG. 2 is utilized and the control device 102 controls the field currents through the first and second field coils 136 and 112 sequentially by applying a first control signal to the first switch circuit 144 and a second control signal to the second switch circuit 106.

The generator 110 is also connected to the electrical absorbing device 120, in this case a 1 kw resistor, via the switch 124. The control device 102 applies a load-dump signal to the switch 124 if the output voltage $V_O$ is above a threshold value, for instance 33V. If the output voltage $V_O$ remains at this voltage for a predetermined time interval, for instance 3 seconds, the control device 102 determines which field circuit has given rise to the overvoltage condition and it either reconfigures or deactivates the faulty switch circuit as described above. The control device 102 further measures the RPM of the generator 110 and/or the vehicle ignition signal and applies a brake signal if either the generator deceleration $\alpha_G$ is above a threshold value $\alpha_C$, for instance—1,500 RPM/second, or the ignition signal indicates that the vehicle engine has been turned off.

Figure 4:
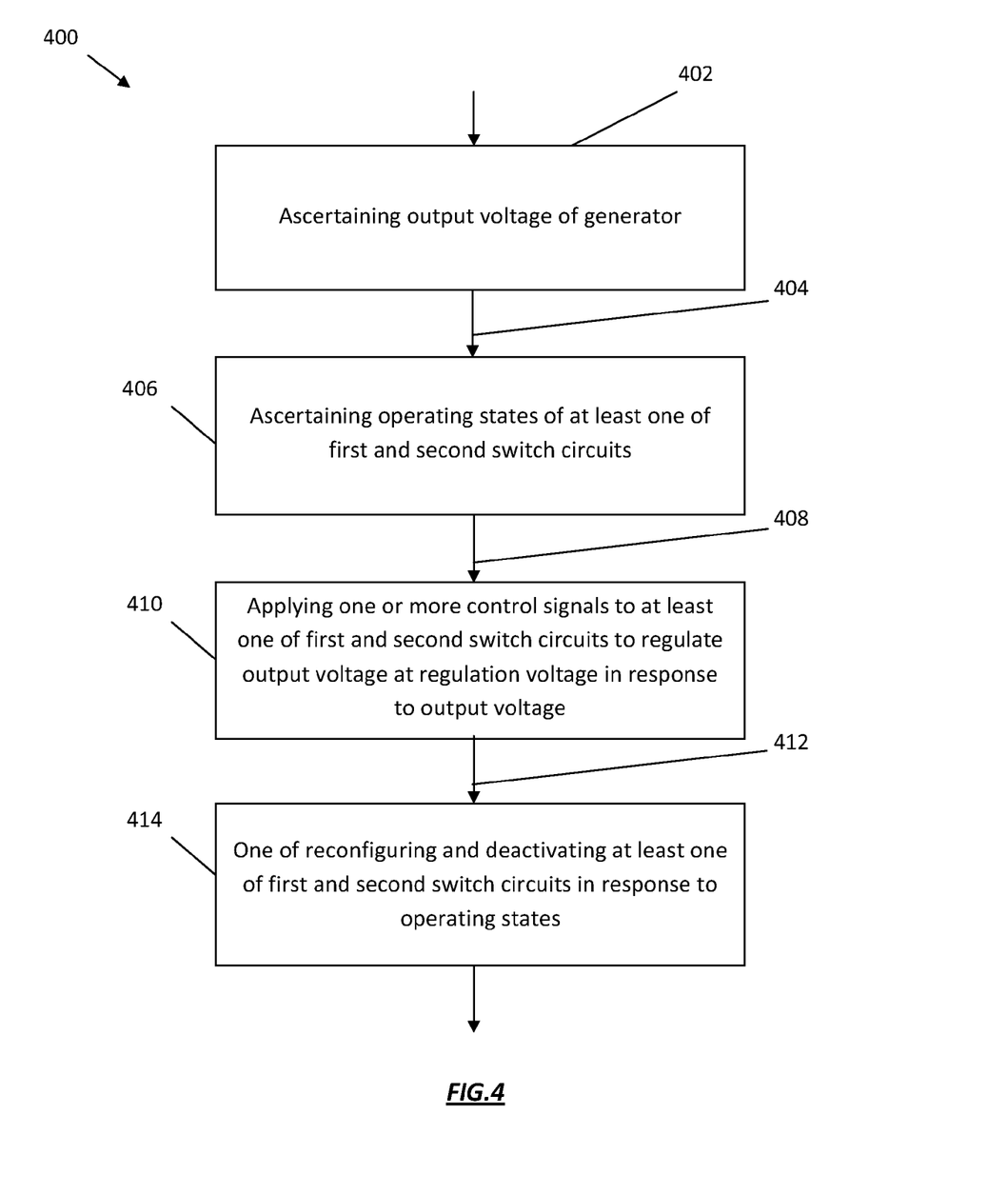
FIG. 4 is a flow diagram of one preferred method of controlling the vehicle electrical system of FIG. 1.

FIG. 4 is a flow diagram 400 of one preferred method of controlling a vehicle electrical system such as those depicted in FIG. 1 and FIG. 3, the latter being used as reference to fully describe the method. According to this embodiment, the method comprises ascertaining an output voltage $V_O$ of the generator 110 at 402. The quantity $V_O$ may be ascertained by direct measurement by a controller such as the controller 358 in FIG. 3, via the line 132 in FIG. 1, or indirect means such as communication between the controller I/O port 362 and vehicle I/O port 302 in FIG. 3. The method further comprises ascertaining operating states of at least one of the first and second switch circuits 144 and 106 at 406. The operating states include properly and improperly operating states as described above. The method further comprises applying one or more control signals, such as PWM signal, to at least one of the first and second switch circuits 144 and 106 to regulate the output voltage $V_O$ of the generator 110 at the regulation voltage $V_R$ in response to the output voltage $V_O$ at 410. The method further comprises one of reconfiguring and deactivating at least one of the first and second switch circuits 144 and 106 in response to the operating states at 414.

Figure 5:
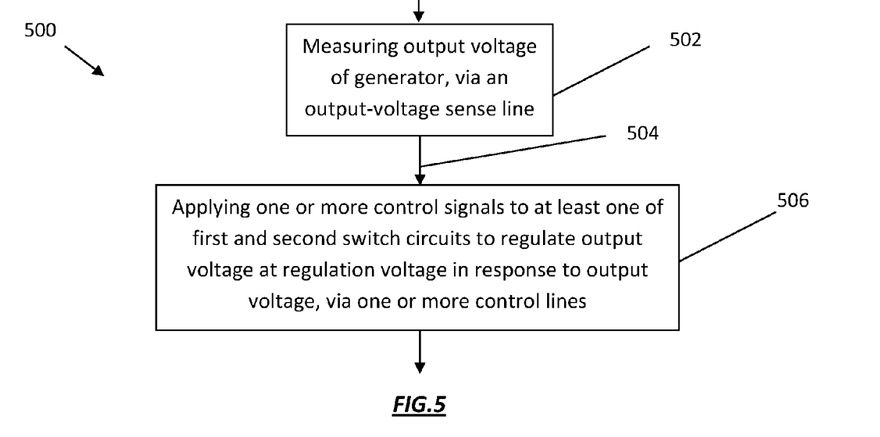
FIG. 5 is a flow diagram of one preferred method of controlling a generator which includes two field coils coupled with two switch circuits.

FIG. 5 is a flow diagram 500 of one preferred method of controlling a generator which includes two field coils coupled with two switch circuits such as those depicted in FIG. 1 and FIG. 2. According to this embodiment, the method comprises measuring an output voltage $V_O$ of the generator 110, via an output-sense line 132 at 502, and applying one or two control signals to one or both of the first switch circuit 208 and second switch circuit 202, via the control lines 214 and 216 to regulate the output voltage $V_O$ at the regulation voltage $V_R$ in response to the output voltage $V_O$ at 506. This method may be implemented for either simultaneous or sequential control of the generator field coils 232 and 236.

Figure 6:
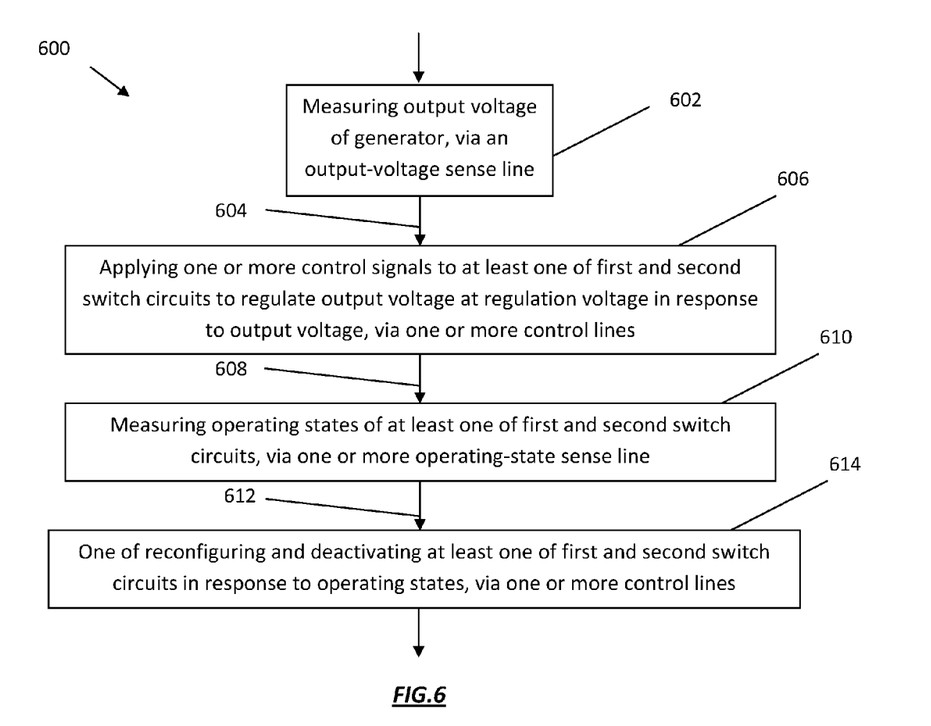
FIG. 6 is a flow diagram of one preferred method of controlling a generator which includes two field coils coupled with two switch circuits, further reconfiguring and/or deactivating the switch circuits.

FIG. 6 is a flow diagram 600 of one preferred method of controlling a generator which includes two field coils coupled with two switch circuits, such as those depicted in FIG. 1 and FIG. 3, further reconfiguring and/or deactivating the switch circuits. According to this embodiment, the method comprises measuring an output voltage $V_O$ of the generator 110, via an output-sense line 132 at 602, and applying a control signal to the first and second switch circuits 144 and 106, via the control line 304 to regulate the output voltage $V_O$ at the regulation voltage $V_R$ in response to the output voltage $V_O$ at 606. The method further comprises measuring operating states of at least one of the first and second switch circuits 144 and 106, via the operating-state sense lines 350 and 352 at 610, and either reconfiguring or deactivating at least one of the first and second switch circuits in response to the operating states, via the control lines 306 and 308 at 614. This method may be implemented for simultaneous control of the generator field coils 328 and 340.

Figure 7:
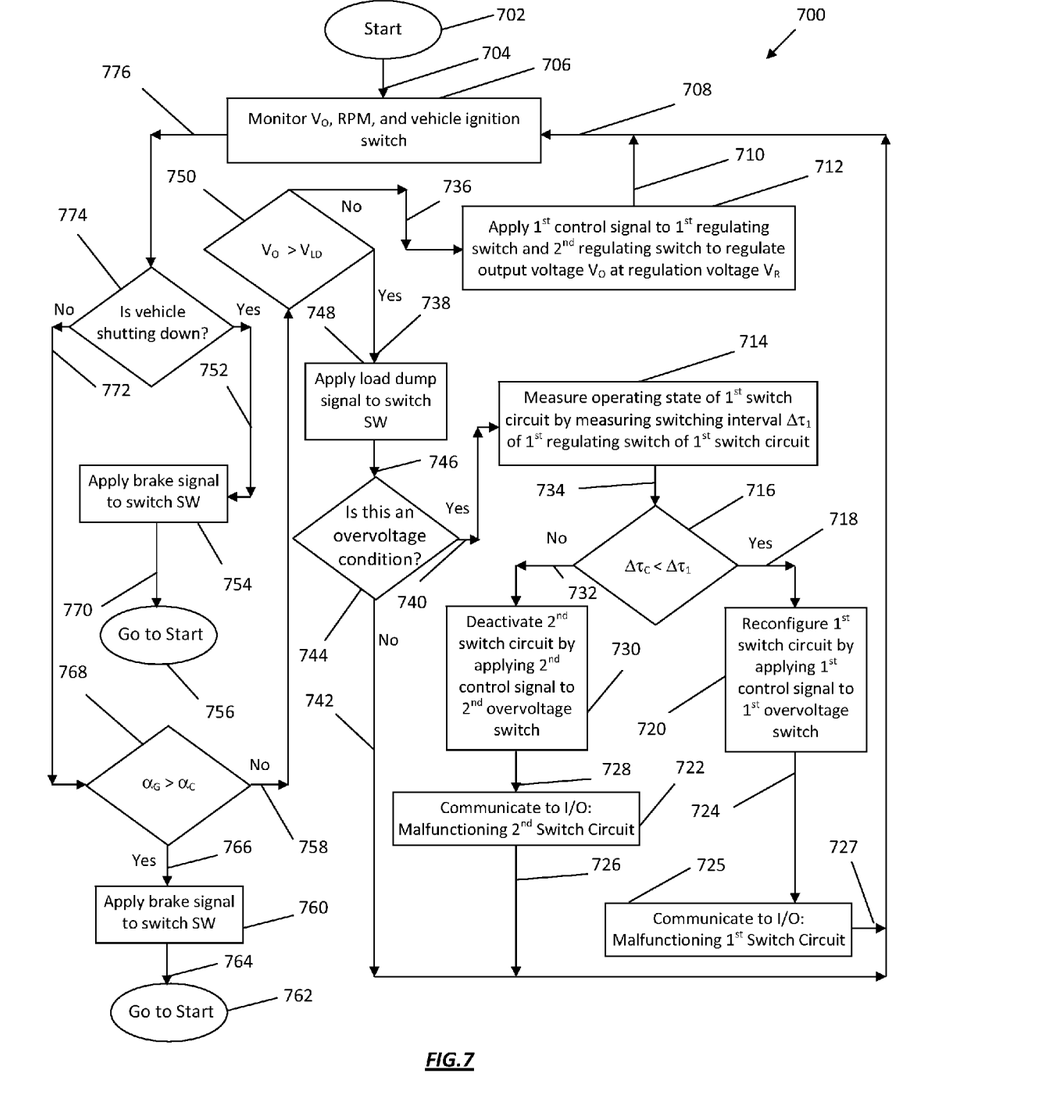
FIG. 7 is a flow diagram of one preferred method of operation of the control device of FIG. 1 that maybe implemented on a processor, included in the control device, further detailing voltage regulation of the generator output voltage utilizing two switch circuits coupled with generator's two field coils, reconfiguration and/or deactivation of the switch circuits, load dump voltage transient response, and generator drive system protection due to generator deceleration and/or vehicle shutdown condition.

FIG. 7 is a flow diagram 700 of one preferred method of operation of the control device 102 in FIG. 1 that maybe implemented on a processor such as the controller 358 in FIG. 3 included in the control device 102, further detailing voltage regulation of the output voltage $V_O$ of the generator 110 utilizing two switch circuits 144 and 106 coupled with generator's two field coils 136 and 112, reconfiguration and/or deactivation of the switch circuits 144 and 106, load dump voltage transient suppression and generator drive system protection due to generator deceleration and/or vehicle shutdown condition, via the electrical energy absorbing device 120 and switch 124. Various system parameters, including but not limited to the output voltage $V_O$, regulation voltage $V_R$, overvoltage $V_{OV}$, load-dump voltage $V_{LD}$, phase winding temperature (T), control signal duty cycle (D), switching interval ($\Delta\tau$), switch circuit operating states, RPM, vehicle shutdown condition, and $\alpha_G$, can either be stored in the processor's RAM/ROM or communicated by the control device via its I/O port.

Upon power up at 702, the processor branches at 704 to monitor the output voltage $V_O$, RPM of the generator 110 and vehicle ignition switch at 706. The processor then branches at 776 to determine if the vehicle is shutting down at 774. If the result of the test is positive, the processor branches at 752 and applies a brake signal to switch on the switch 124 at 754. The processor then branches at 770 to go to the start of the program at 756 (same as 702). If the result of the test is negative, the processor branches at 772 and performs a test at 768 to determine if the generator deceleration $\alpha_G$ is greater than a threshold deceleration $\alpha_C$. If the result of the test is positive, the processor branches at 766 and applies a brake signal to switch on the switch 124 at 760. The processor then branches at 764 to go to the start of the program at 762 (same as 702).

If the result of the test is negative, the processor branches at 758 and performs a test at 750 to determine if the output voltage $V_O$ of the generator 110 is greater than a load-dump threshold value $V_{LD}$. If the result of the test is negative, the processor branches at 736 and applies a control signal to the first and second regulating switches, such as the regulating switches 324 and 334 in FIG. 3, to regulate the output voltage $V_O$ of the generator 110 at the regulation voltage $V_R$ at 712. The processor then branches at 710 to monitor the output voltage $V_O$, RPM of the generator 110 and vehicle ignition switch at 706.

If the result of the test is positive, the processor branches at 738 and applies a load dump signal to switch on the switch 124 at 748. The processor then branches at 746 to determine if an overvoltage condition exists at 744.

If the result of the test is negative, the processor branches at 742 to monitor the output voltage $V_O$, RPM of the generator 110 and vehicle ignition switch at 706. If the result of the test is positive, the processor branches at 740 to measure operating states of the first switch circuit by measuring the switching interval $\Delta\tau_1$ of the first regulating switch, such as the first regulating switch 324 in FIG. 3, of the first switch circuit at 714. The processor then branches at 734 to perform a test to determine if the first switch circuit is operating properly or improperly, i.e., if the switching interval $\Delta\tau_1$ is greater than a threshold switching interval $\Delta\tau_C$ at 716.

If the result of the test is positive, the processor branches at 718 to reconfigure the first switch circuit by applying a first control signal to the first overvoltage switch, such as the first overvoltage switch 314 in FIG. 3, at 720. The processor then branches at 724 to send a communication signal to the vehicle I/O Port to indicate that the first switch circuit is malfunctioning at 725. The processor then branches at 727 to continue to monitor the output voltage $V_O$, RPM of the generator 110 and vehicle ignition switch at 706.

If the result of the test is negative, the processor branches at 732 to deactivate the second switch circuit by applying a second control signal to the second overvoltage switch, such as the second overvoltage switch 338 in FIG. 3, at 730. The processor then branches at 728 to send a communication signal to the vehicle I/O Port to indicate that the second switch circuit is malfunctioning at 722. The processor then branches at 726 to continue to monitor the output voltage $V_O$, RPM of the generator 110 and vehicle ignition switch at 706.

The foregoing discloses a vehicle electrical system including a dual field coil generator which provides electrical power to an electrical load. A control device controls the field currents through both field coils via a first and second switch circuits. The control device operates the first and second switch circuits to regulate the generator output voltage and, in the alternative, to further reconfigure and/or deactivate the switch circuits based on their operating states. An electrical absorbing device is coupled with the generator via a switch. The control device may be further configured to apply a control signal to the switch in response to a vehicle shutdown condition, generator RPM, rate of change of RPM, and voltage transient.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A vehicle electrical system, comprising:
   a generator coupled with an electrical load, the generator comprising a stator winding, a first field coil and a second field coil to regulate a same output voltage of the generator, wherein a flux generated by the first field coil and the second field coil interacts with the stator winding;
   a first switch circuit coupled with the first field coil, wherein the first switch circuit comprises a first overvoltage switch coupled to a first side of the first field coil and a first regulating switch coupled to a second side of the first field coil;
   a second switch circuit coupled with the second field coil, wherein the second switch circuit comprises a second overvoltage switch coupled to a first side of the second field coil and a second regulating switch coupled to a second side of the second field coil; and
   a control device coupled with the generator, the first switch circuit, and the second switch circuit;
   wherein the control device is configured to:

monitor the output voltage of the generator, the output voltage provided using both the first field coil and the second field coil;
ascertain an operating state of at least one of the first switch circuit and the second switch circuit;
apply one or more control signals simultaneously to both the first switch circuit and the second switch circuit to regulate the output voltage at a regulation voltage in response to the output voltage;
deactivate one of the first switch circuit and the second switch circuit in response to the operating state to turn off a corresponding field circuit; and
when one of the first switch circuit or the second switch circuit is deactivated, monitor the output voltage of the generator, the output voltage provided using the active one of the first field coil or the second field coil.

2. The system of claim 1, wherein the operating state comprises a properly operating state and an improperly operating state.

3. The system of claim 1, wherein the control device is further configured to communicate-the operating state to the vehicle electrical system.

4. The system of claim 1, further comprising:
an electrical energy absorbing device coupled with the generator, via a switch;
wherein the control device is further coupled with the switch and configured to:
apply a load-dump signal to the switch when the output voltage is above a threshold value.

5. The system of claim 1, further comprising:
an electrical energy absorbing device coupled with the generator, via a switch;
wherein the control device is further coupled with the switch and configured to:
ascertain a rotational speed of the generator; and
apply a brake signal to the switch in response to at least one of the rotational speed and a rate of change of the rotational speed.

6. The system of claim 1, further comprising:
an electrical energy absorbing device coupled with the generator, via a switch;
wherein the control device is further coupled with the switch and configured to:
ascertain a shutdown condition of the vehicle; and
apply a brake signal to the switch in response to the shutdown condition.

7. A vehicle electrical system, comprising:
a generator coupled with an electrical load, said generator comprising a first field coil and a second field coil to regulate an output voltage of the generator;
a first switch circuit coupled with the first field coil, wherein the first switch circuit comprises a first overvoltage switch coupled to a first side of the first field coil and a first regulating switch coupled to a second side of the first field coil;
a second switch circuit coupled with the second field coil, wherein the second switch circuit comprises a second overvoltage switch coupled to a first side of the second field coil and a second regulating switch coupled to a second side of the second field coil; and
a control device coupled with the generator, the first switch circuit, and the second switch circuit;
wherein the control device is configured to:
monitor the output voltage of the generator;
apply a same control signal to at least one of the first switch circuit and the second switch circuit to regulate the output voltage at a regulation voltage in response to the output voltage; and
when one of the first switch circuit or the second switch circuit is deactivated in response to the one or more control signals to deactivate a corresponding field coil, monitor the output voltage of the generator provided via a remaining active one of the first field coil and the second field coil.

8. A method for controlling a vehicle electrical system, the vehicle electrical system comprising a first switch circuit, a second switch circuit, and a generator including a first field coil and a second field coil, wherein the generator is coupled with an electrical load and the first switch circuit is coupled with the first field coil and the second switch circuit is coupled with the second field coil, the method comprising:
monitoring an output voltage of the generator, wherein the output voltage is regulated using the first field coil and the second field coil, wherein the first switch circuit comprises a first overvoltage switch coupled to a first side of the first field coil and a first regulating switch coupled to a second side of the first field coil and the second switch circuit comprises a second overvoltage switch coupled to a first side of the second field coil and a second regulating switch coupled to a second side of the second field coil;
ascertaining operating states of at least one of the first switch circuit and the second switch circuit;
applying one or more control signals to at least one of the first switch circuit and the second switch circuit to regulate the output voltage at a regulation voltage in response to the output voltage;
one of reconfiguring and deactivating at least one of the first switch circuit and the second switch circuit in response to the operating states, wherein deactivating one of the first switch circuit and the second switch circuit comprises deactivating a corresponding one of the first field coil and the second field coil; and
in response to deactivating one of the first switch circuit and the second switch circuit, monitoring the output voltage of the generator as provided by a remaining one of the first field coil and the second field coil.

9. The method of claim 8, wherein the first switch circuit and the second switch circuit are simultaneously controlled by a same control signal and wherein the vehicle electrical system further comprises an electrical energy absorbing device coupled with the generator via a switch, the method further comprising:
applying a load-dump signal to the switch when the output voltage is above a threshold value.

10. The method of claim 8, wherein the vehicle electrical system further comprises an electrical energy absorbing device coupled with the generator via a switch, the method further comprising:
ascertaining a rotational speed of the generator; and
applying a brake signal to the switch in response to at least one of the rotational speed and a rate of change of the rotational speed.

11. The method of claim 8, wherein the vehicle electrical system further comprises an electrical energy absorbing device coupled with the generator via a switch, the method further comprising:
ascertaining a shutdown condition of the vehicle; and
applying a brake signal to the switch in response to the shutdown condition.

12. A control device coupled with a first switch circuit, a second switch circuit, and a generator including a first field coil and a second field coil, wherein the generator is coupled with an electrical load and the first switch circuit is coupled with the first field coil and the second switch circuit is coupled with the second field coil, the control device comprising:
- a controller;
- wherein the controller is configured to:
  - measure an output voltage of the generator, via an output-voltage sense line wherein the output voltage is regulated using the first field coil and the second field coil, wherein the first switch circuit comprises a first overvoltage switch coupled to a first side of the first field coil and a first regulating switch coupled to a second side of the first field coil and the second switch circuit comprises a second overvoltage switch coupled to a first side of the second field coil and a second regulating switch coupled to a second side of the second field coil;
  - measure operating states of at least one of the first and second switch circuits, via one or more operating-state sense line;
  - apply, via one or more control lines, one or more control signals to the first switch circuit and the second switch circuit to regulate the output voltage at a regulation voltage in response to the output voltage; and
  - deactivate at least one of the first switch circuits and the second switch circuits in response to the operating states, via the one or more control lines.

13. The control device of claim 12, wherein the generator is further coupled with an electrical energy absorbing device via a switch, wherein the control device is further coupled with the switch, and wherein the controller is further configured to:
- apply, via the one or more control lines, a load-dump signal to the switch when the output voltage is above a threshold value.

14. The control device of claim 12, wherein the generator is further coupled with an electrical energy absorbing device via a switch, wherein the control device is further coupled with the switch, and wherein the controller is further configured to:
- measure, via a speed sense line, a rotational speed of the generator; and
- apply, via the one or more control lines, a brake signal to the switch in response to at least one of the rotational speed and a rate of change of the rotational speed.

15. The control device of claim 12, wherein the control device is further coupled with a vehicle, wherein the generator is further coupled with an electrical energy absorbing device, via a switch, wherein the control device is further coupled with the switch, and wherein the controller is further configured to:
- measure, via a vehicle-condition sense line, a shutdown condition of the vehicle; and
- apply, via the one or more control lines, a brake signal to the switch in response to the shutdown condition.

16. A method for controlling a generator that includes a first field coil and a second field coil, wherein the generator is coupled with an electrical load, wherein the first field coil is coupled with a first switch circuit, and wherein the second field coil is coupled with a second switch circuit, the method comprising:
- measuring an output voltage of the generator, via an output-voltage sense line;
- applying, via one or more control lines, one or more control signals to the first switch circuit and the second switch circuit to regulate the output voltage at a regulation voltage in response to the output voltage, wherein the first switch circuit comprises a first overvoltage switch coupled to a first side of the first field coil and a first regulating switch coupled to a second side of the first field coil and the second switch circuit comprises a second overvoltage switch coupled to a first side of the second field coil and a second regulating switch coupled to a second side of the second field coil; and
- in response to deactivating one of the first switch circuit and the second switch circuit via the one or more control lines, monitoring the output voltage of the generator as provided by a remaining active one of the first field coil and the second field coil.

17. The method of claim 16, further comprising:
- measuring, via one or more operating-state sense lines, operating states of at least one of the first switch circuit and the second switch circuit; and
- one of reconfiguring and deactivating, via the one or more control lines, at least one of the first and second switch circuits in response to the operating states.

18. The method of claim 16, wherein the generator is further coupled with an electrical energy absorbing device via a switch, the method further comprising:
- applying, via the one or more control lines, a load-dump signal to the switch when the output voltage is above a threshold value.

19. The method of claim 16, wherein the generator is further coupled with an electrical energy absorbing device via a switch, the method further comprising:
- measuring a rotational speed of the generator via a speed sense line; and
- applying, via the one or more control lines, a brake signal to the switch in response to at least one of the rotational speed and a rate of change of the rotational speed.

20. The method of claim 16, wherein the generator is further coupled with an electrical energy absorbing device, via a switch, said method further comprising:
- measuring, via a vehicle-condition sense line, a shutdown condition of a vehicle; and
- applying, via the one or more control lines, a brake signal to the switch in response to the shutdown condition.

* * * * *